(12) United States Patent
Woźniak et al.

(10) Patent No.: US 12,511,815 B2
(45) Date of Patent: Dec. 30, 2025

(54) SYSTEM AND METHOD FOR PRIMITIVE ID MAP SAMPLING

(71) Applicants: Advanced Micro Devices, Inc., Santa Clara, CA (US); ATI Technologies ULC, Markham (CA)

(72) Inventors: Michal Adam Woźniak, Santa Clara, CA (US); Guennadi Riguer, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 172 days.

(21) Appl. No.: 18/345,460

(22) Filed: Jun. 30, 2023

(65) Prior Publication Data

US 2025/0005841 A1    Jan. 2, 2025

(51) Int. Cl.
*G06T 15/04*        (2011.01)
*G06T 7/73*         (2017.01)

(52) U.S. Cl.
CPC .............. *G06T 15/04* (2013.01); *G06T 7/73* (2017.01); *G06T 2210/52* (2013.01)

(58) Field of Classification Search
None
See application file for complete search history.

(56) References Cited

U.S. PATENT DOCUMENTS

| | | | |
|---|---|---|---|
| 2007/0097141 A1* | 5/2007 | Barenbrug | G06T 15/04 345/582 |
| 2017/0084078 A1* | 3/2017 | Boudier | G06T 15/005 |
| 2018/0300915 A1* | 10/2018 | Heggelund | G06T 7/11 |
| 2019/0026925 A1* | 1/2019 | Sakurai | G06T 15/04 |
| 2022/0392138 A1* | 12/2022 | Kokins | G06T 15/405 |

* cited by examiner

*Primary Examiner* — Anh-Tuan V Nguyen
(74) *Attorney, Agent, or Firm* — Volpe Koenig

(57) ABSTRACT

A technique for sampling a primitive ID map. The technique includes identifying a sample point having a location in a texture space; obtaining a primitive ID sample from the primitive ID map based on the location of the sample point in the texture space; identifying a primitive based on the primitive ID; testing the location in the texture space for inclusion within the identified primitive; and selecting either the primitive ID or a different primitive ID based on the testing.

20 Claims, 8 Drawing Sheets

SYSTEM AND METHOD FOR PRIMITIVE ID MAP SAMPLING

BACKGROUND

Three-dimensional graphics processing involves rendering three-dimensional scenes by converting models specified in a three-dimensional coordinate system to pixel colors for an output image. Improvements to three-dimensional graphics processing are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for sampling a primitive ID map. The technique includes identifying a sample point having a location in a texture space; obtaining a primitive ID sample from the primitive ID map based on the location of the sample point in the texture space; identifying a primitive based on the primitive ID; testing the location in the texture space for inclusion within the identified primitive; and selecting either the primitive ID or a different primitive ID based on the testing.

Figure 1:
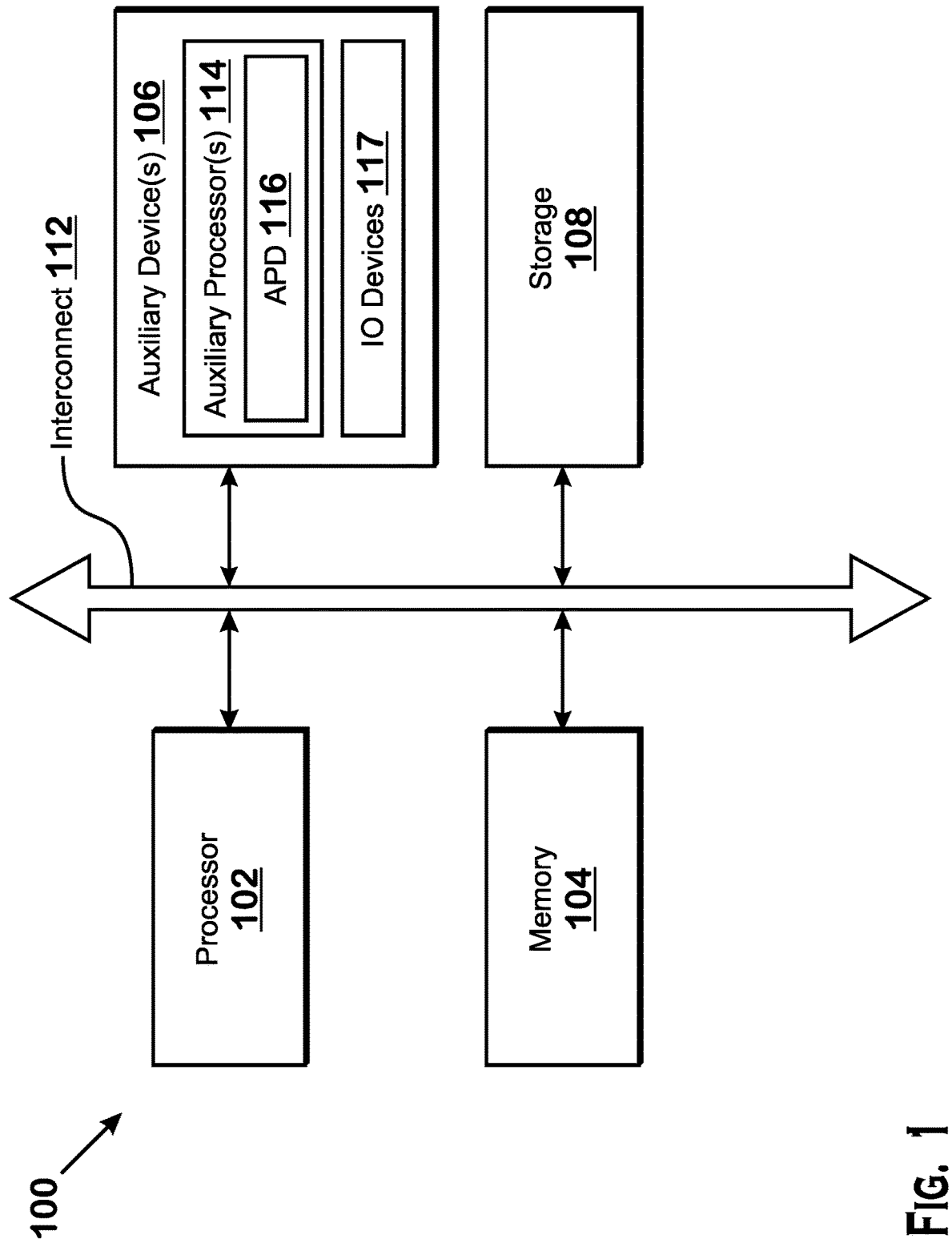
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
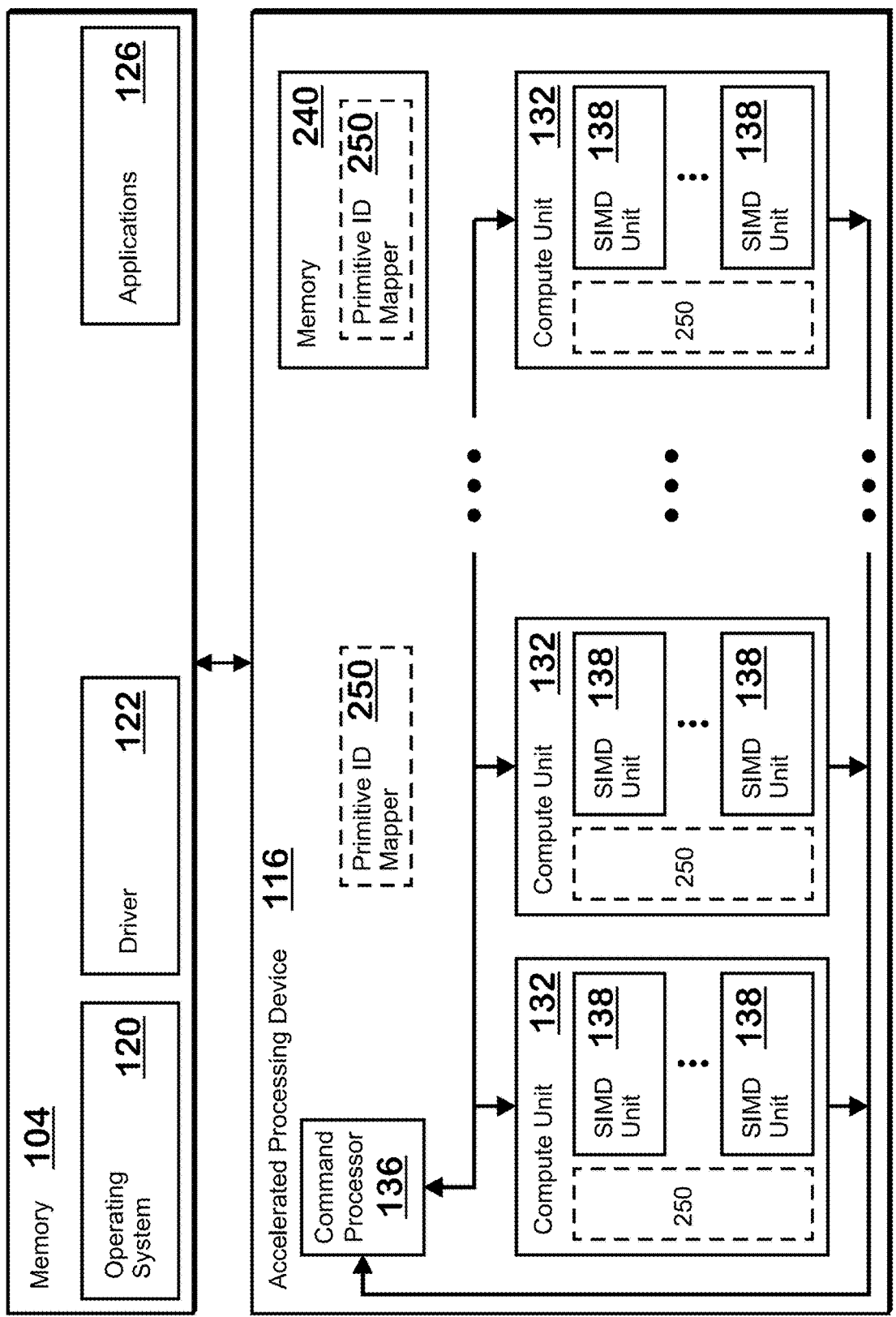
FIG. 2 illustrates details of the device of FIG. 1 and an accelerated processing device, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. A command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

A primitive ID mapper 250 is present and is shown in several alternative forms. The primitive ID mapper 250 is in various examples implemented as hardware circuitry (e.g., within the APD 116 or more particularly within one or more compute units 132), or as software executing on a processor (e.g., stored within APD memory 240). Although some locations for the primitive ID mapper 250 are shown, the primitive ID mapper 250 is, in various examples, located at any technically feasible location. In various examples, the primitive ID mapper 250 is embodied as hardware (e.g., as circuitry configured to perform the operations described herein), as software (e.g., as instructions configured to execute on one or more processors, including one or more processors shown or described or not shown or described), as a combination of software and hardware, or in any other technically feasible manner. In some implementations where the primitive ID mapper 250 is or includes hardware, the entirety or part of the primitive ID mapper 250 is or includes a processor. In various examples, this processor is a fixed function processor, a programmable processor, a field programmable gate array or other form of programmable logic circuit, an application specific integrated circuit, or is implemented in any technically feasible manner.

Figure 3:
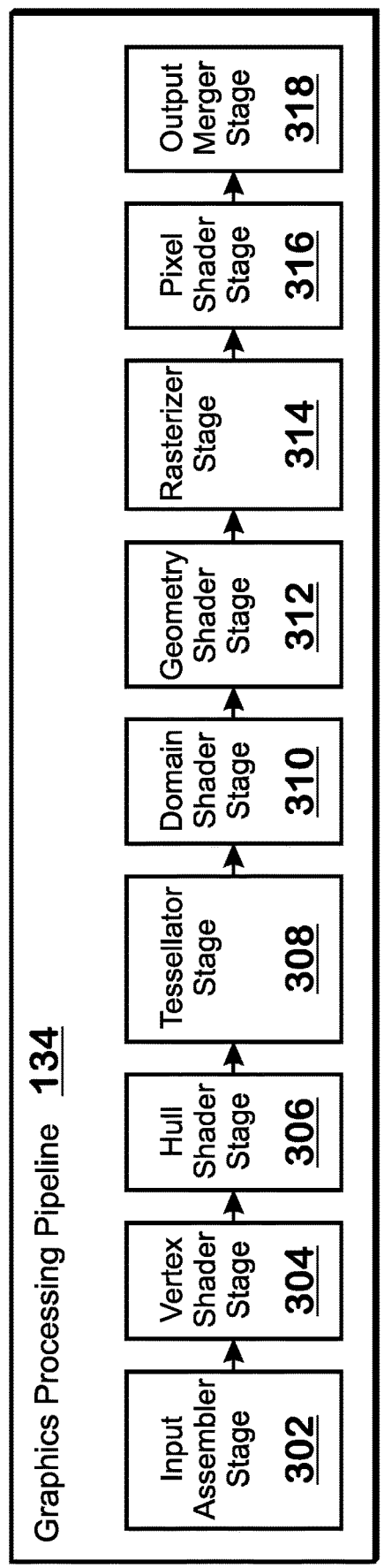
FIG. 3 is a block diagram showing additional details of the graphics processing pipeline illustrated in FIG. 2.

FIG. 3 is a block diagram showing additional details of the graphics processing pipeline 134 illustrated in FIG. 2. Note that although it is possible to implement the teachings described herein in the context of the graphics processing pipeline 134, it is also possible to use the teachings presented herein in other contexts, such as with compute shaders and/or with hardware other than the APD 116. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Techniques are provided herein that allow mapping between a flat object-local texture and primitives of a three-dimensional mesh. It is often desirable, when processing a three-dimensional object such as a mesh (e.g., a collection of triangles), to be able to generate or process an object space texture. In this context, an object space texture is a flat two-dimensional texture that provides graphical information for the surfaces of a mesh.

In one example use case, referred to as decoupled shading, the samples of the texture in the 2D texture space represent shading data. Decoupled shading involves rendering object appearance to an object-local texture and applying the texture to the object in a subsequent pass. This form of rendering can provide benefits such as eliminating redundant or unnecessary work by limiting work performed to that which would impact the final image or by allowing some calculations to be reused in instances where such reuse would previously not be possible. Although an example use is described, other use cases for such textures are possible.

When working with object space textures, it is desirable to be able to map points within the texture space to primitives (e.g., triangles) in the three-dimensional object space. Note that the texture, itself, does not explicitly include this information. Specifically, the texture includes a plurality of texels, each associated with a texture coordinate (a point in the texture). While primitives associated with the texture include texture coordinates for their vertices, this allows mapping from the three-dimensional model to points in the texture. However, such information does not provide a mapping from the texture coordinates back to the primitives. Techniques are thus provided herein to facilitate determining which primitives in a three-dimensional object are associated with points in a texture associated with that object.

Figure 4:
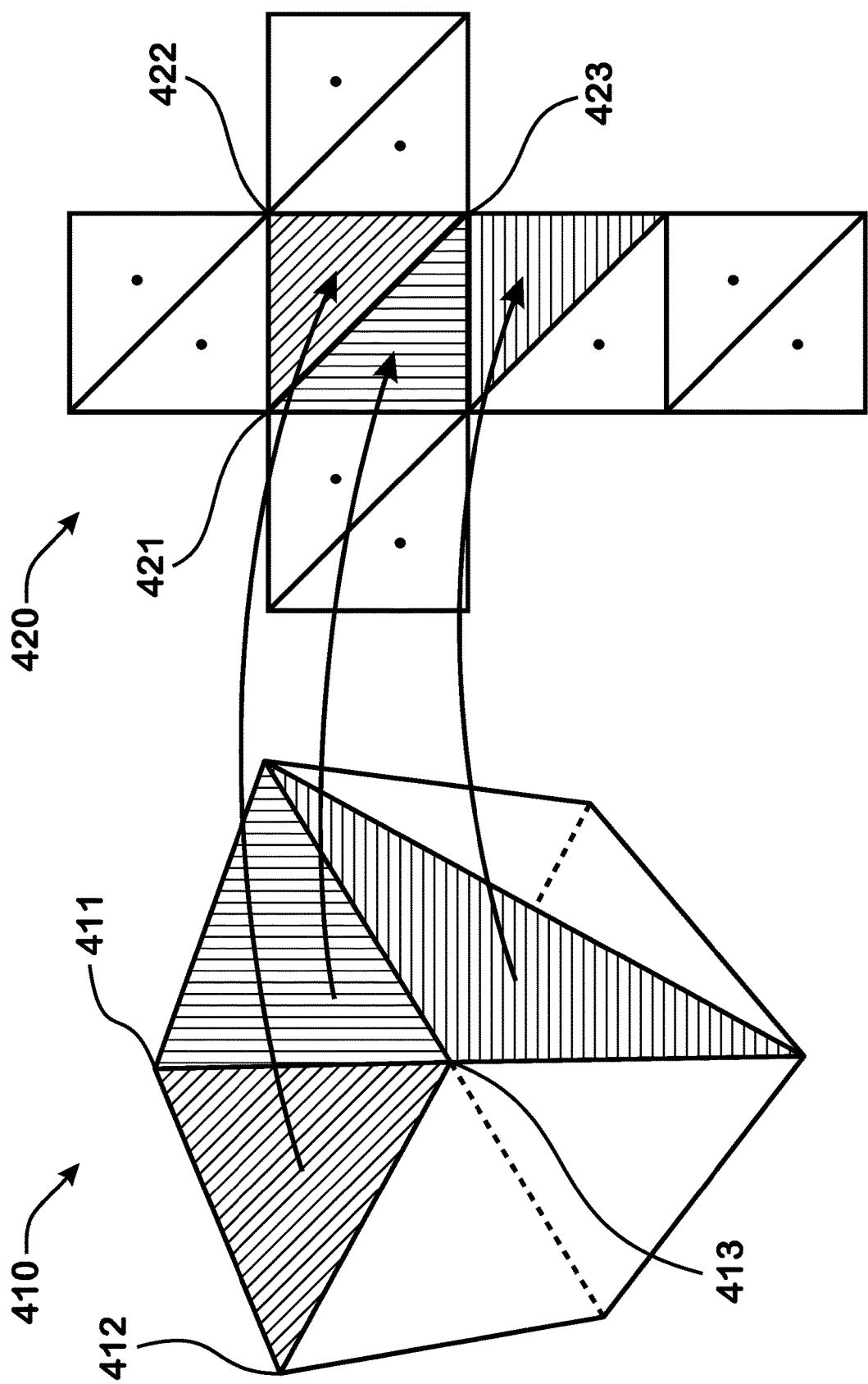
FIG. 4 illustrates the correspondence between a three-dimensional space and a texture space, according to an example.

FIG. 4 illustrates an example correspondence between a 3D object space (also sometimes called a "mesh space" herein) 410 and a corresponding 2D texture space 420. The process for finding a mapping between 3D coordinates in the object space and the 2D coordinates in the texture space is referred to as mesh parameterization or mesh unwrapping. In the conversion, 3D vertex positions are projected to a plane, creating a unique mapping from points on the 3D mesh surface to coordinates in the texture space. For example, the 3D vertex positions 411, 412 and 413 are projected onto the 2D plane of texture space 420 as positions 421, 422 and 423.

In an example, the 2D texture space 420 represents an image to be rendered and used as a texture. In such an example, a shader performs shading operations for one or more texels of the texture. In some examples, such shading depends on mesh attributes (position, normal vector, texture UV coordinates, etc.) in 3D space. Therefore, a transformation is required to reconstruct the mesh attributes for a given 2D position in texture space 420. This transformation is accomplished using a primitive ID map, described further herein. The primitive ID map is an image created by generating primitive ID samples for each sample area of texture space 420. Each such sample is associated with a particular primitive of the 3D mesh. The result of this generating is a primitive ID map which is an "image." Each sample of that image includes a primitive identifier ("ID"). Each primitive ID is associated with or identifies a particular primitive (e.g., triangle) of the mesh.

One drawback of using a primitive ID map is memory requirements, as the primitive ID map's resolution dictates precision and correctness of the lookup. More specifically, primitive ID map resolution corresponds with lookup precision at the edges of triangles where each primitive ID sample area can cover more than one triangle. It is possible, for example, for a large primitive ID map sample area to correspond to multiple triangles, in which case the primitive ID for that sample could not sufficiently allow correct lookup of a primitive ID for all positions within that primitive ID sample area. Additionally, sampled locations might not precisely align with the sample location associated with a particular primitive used for generation of the primitive ID map. In an example, a lookup can completely miss small triangles. This imprecision can be improved by increasing the resolution of the primitive ID map, but increasing the resolution raises memory requirements. Thus, in this disclosure, both the structure of the primitive ID map and the lookup mechanism are improved to mitigate these issues. For example, spatial redundancy in the primitive ID map is exploited to store primitive IDs for triangles which otherwise would not be present in the map due to the small size of such triangles. This results in a more precise lookup along the edges of triangles. Additional details follow.

Figure 5:
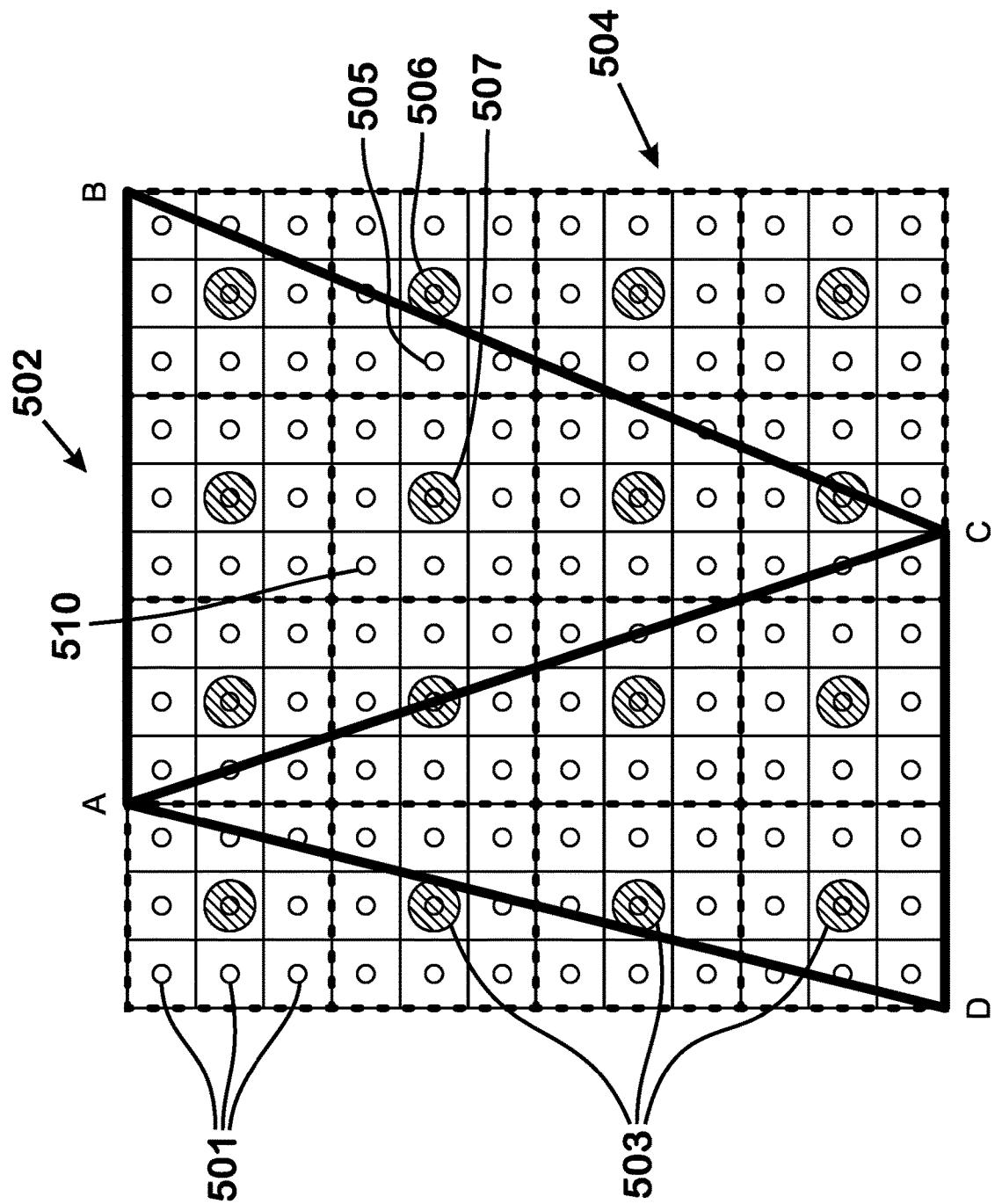
FIG. 5 illustrates triangles having texture samples in a texture space with primitive map ID samples superimposed thereon, according to an example.

FIG. 5 illustrates texture samples 501 in a 2D texture space 502. The 2D texture space 502 is represented by the grid of texture sample area boxes outlined with thin solid lines. Each texture sample 501 is associated with a particular texture sample area box. A primitive ID map 504 is in the same space as 2D texture space 502. Primitive ID map 504 is represented by primitive ID samples 503, each of which has an associated primitive ID sample area box having a dashed outline that encloses the area associated with the primitive ID sample 503. In the example illustrated, samples 503 in primitive ID map 504 have a lower resolution than samples 501 in the 2D texture space 502, though this resolution relationship is not necessary. In fact, the resolution scales do not have to be multiple integers and there could be an arbitrary mismatch between the texture space and primitive ID map samples.

As described above, the primitive ID mapper 250 maps locations of samples 501 in the texture space 502 to primitive IDs. In order to perform this mapping, the primitive ID mapper 250 selects a sample 501 (e.g., sample 505). The primitive ID mapper 250 then identifies a primitive ID sample 503 that is associated with the selected sample 501. The primitive ID mapper 250 uses any of a variety of selection criteria to determine which primitive ID 503 is associated with a given sample 501. In some examples, the primitive ID mapper 250 select the primitive ID sample 503 for a given texture sample 501 as the primitive ID sample 503 that is closest to the texture sample 501.

After selecting a particular primitive ID sample 503, the primitive ID mapper 250 tests the selected primitive ID 503 to determine whether the texture sample 501 actually falls within the triangle associated with the selected primitive ID sample 503.

In some examples, the primitive ID mapper 250 determines the vertices of the triangle from the selected primitive ID. More specifically, the primitive ID mapper 250 is able to look up the texture coordinates of the primitive associated with the selected primitive ID. These texture coordinates describe the coordinates of the primitive (e.g., triangle) in the texture space 502. These texture coordinates are typically available, as these coordinates describe how textures apply to primitives. With these texture coordinates, which are in the coordinate system of the texture 502, the primitive ID mapper 250 is able to determine whether the sample 501 is within the primitive associated with the selected primitive ID.

Figure 6B:
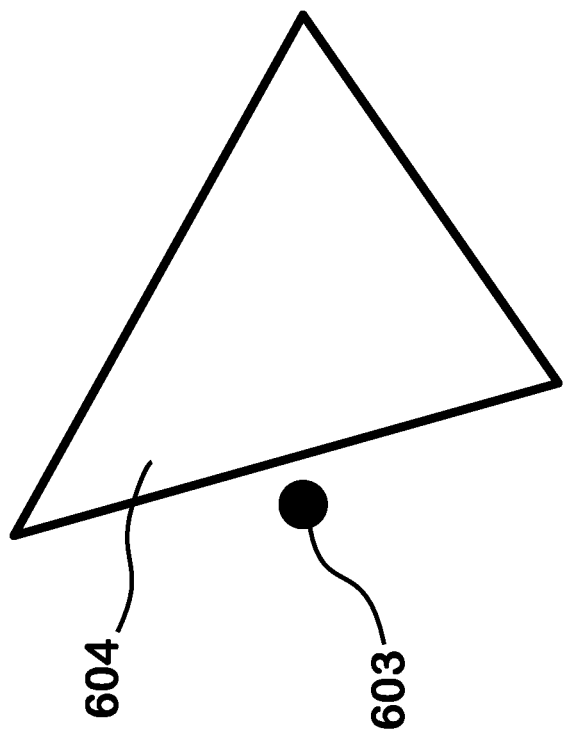
FIGS. 6A and 6B illustrate examples of an inclusion test.
Figure 6A:
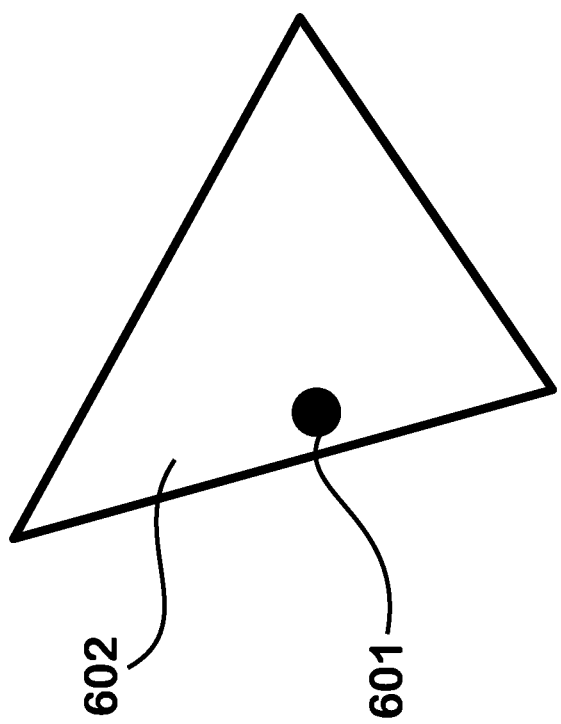

FIGS. 6A and 6B illustrate examples of the inclusion test. In this example, the texture coordinates of the primitive vertices are used to calculate barycentric coordinates of the sample 501 with respect to the vertices of the primitive. In general, barycentric coordinates are triangle-specific coordinates that are associated with the location of a point with respect to that triangle. Barycentric coordinates typically include three coordinate components such as u, v, and w. Each such component is associated with one of the vertices of the triangle and depends on the relative position of the point to the vertices. In an example, the inclusion test indicates whether a point (e.g., the sample 501) is within a triangle. In such an example, if all barycentric coordinate components for a sample are within the range of 0 and 1, then the point is within the triangle, and if any component is negative, then the point is outside of the triangle.

FIGS. 6A and 6B illustrate example inclusion tests. In FIG. 6A, the outcome of the inclusion test is positive because point 601 is within triangle 602. Conversely, in FIG. 6B, the outcome of the inclusion test is negative because point 603 is outside of triangle 604.

Referring back to FIG. 5, as just stated, the primitive ID mapper 250 selects a particular primitive ID sample 503 based on a selection criterion. If the inclusion test for the texture sample 501 is positive (the point is within the triangle identified by the primitive ID sample 503), then the primitive ID mapper 250 determines that the identified primitive is the correct primitive for the texture sample 501. In such instances, the primitive ID mapper 250 or other entity uses this primitive for subsequent steps such as shading the texture sample 501 using information from the identified primitive. If the inclusion test indicates the texture sample 501 is not within the identified primitive, then the inclusion test is considered to have failed and the primitive ID mapper 250 searches for a different primitive ID that would identify the correct primitive for the texture sample 501. In some examples, this search includes searching within a search area that surrounds the first primitive ID sample 503 identified. The primitive ID mapper 250 finds a correct primitive ID sample 503 in the event that the triangle associated with that primitive ID sample includes the texture sample 501 for which the search is occurring.

In the example shown in FIG. 5, the initially selected primitive ID sample 506 for texture sample 505 is the primitive ID that identifies an area to the right of triangle ABC. Because the inclusion test for point 505 and this triangle fails, the primitive ID mapper 250 next selects primitive ID 507 for testing. The primitive ID mapper 250 performs a lookup to identify the vertices corresponding to the primitive ID 507, which provide triangle vertices for triangle ABC. In this example, point 505 is within triangle ABC, and thus the primitive ID mapper 250 determines that the correct primitive has been found for the texture sample 505. A different sample 510 is shown. In some examples, the first primitive ID map sample for this sample 510 would be 507, and this would be the correct sample.

Although in the example a triangle was found, it is possible that no primitive ID within a search window identifies a triangle that the texture sample falls within. In such a situation where no match is found, the primitive ID mapper 250 identifies any of the primitive ID samples within the search area as identifying the "correct" primitive. In some examples, the primitive ID mapper 250 selects the closest primitive ID sample to the texture sample as identifying the "correct" primitive.

It should be understood that the term "primitive" and "triangle" are sometimes used interchangeably herein.

As can be seen from the above, the primitive ID map does not have perfect correspondence to the underlying primitives. More specifically, it is not required for any particular primitive ID sample to refer to the triangle that the primitive ID sample actually falls within. For example, if the area of a particular triangle includes four primitive ID samples, then it is possible for one or more of such primitive ID samples to refer to a different primitive. In an example, such a situation arises where a small triangle is not represented in the primitive ID map due to a lack of resolution of the primitive ID map. In one such example, the area of a small triangle covers none of the primitive ID samples of the primitive ID map. To account for this possibility, in some instances one or more of the primitive ID samples that are redundant or unused and/or are not covered by a particular primitive are assigned to that primitive regardless. In some examples, one or more such primitive ID samples allow for representation of smaller triangles in the primitive ID map despite such small triangles not overlapping any primitive ID sample.

The word "redundant" reflects the fact that large primitives cover multiple primitive ID samples. Because of the neighborhood searching mechanism, some of these primitive ID samples are not strictly necessary and are thus "redundant." These redundant samples can be used to represent unrepresented triangles, for example by placing a primitive ID sample associated with a primitive that does not cover any primitive ID samples next to a primitive sample that would be selected for a texture sample for that triangle. In some examples, unused primitive ID samples are primitive ID samples that are not covered by any triangle. In such examples, such primitive ID samples could be associated with a triangle that would otherwise not be represented due to not covering any primitive ID sample.

It should be understood that the use of redundant or unused primitive ID samples in this manner allows the primitive ID map to have a lower resolution than if such techniques were not used. More specifically, unrepresented triangles could be represented by increasing the resolution of the primitive ID map. However, by providing the searching mechanism and by representing unrepresented triangles in the primitive ID map (for example, in redundant or unused primitive ID samples), the searching mechanism allows such unrepresented triangles to be represented. The primitive ID map can be thought of as a searching tool that allows the primitive ID mapper 250 to look up which primitive is associated with a particular texture sample. In this conception, the samples of the primitive ID map do not have to correspond completely with the areas of the underlying triangles. The searching mechanism that occurs upon inclusion test failure allows the "correct" triangle to be found in many instances where such triangle cannot be directly represented in the primitive ID map. In a more general sense, the primitive ID map data structure could be further modified to include the otherwise missed samples by means of data indirection or inclusion of other data structures. The search area does not have to be a local neighborhood of the sample, but could be defined algorithmically, for example, as a coordinate offset or in some other manner.

A technique has just been described for creating or refining a primitive ID map to include primitive ID samples associated with one or more "unrepresented triangles." In various examples, this technique is performed by a primitive ID map generator. In various examples, the primitive ID map generator is software executing on a processor, hardwired circuitry, or a combination thereof. Example hardwired circuitry includes an analog circuit, a digital circuit, a programmable processor, a field programmable gate array or other programmable logic circuitry, an application specific integrated circuit, or any other circuit. In various examples, the primitive ID map generator is included in the same system as the primitive ID mapper 250 or in a different system as the primitive ID mapper 250. In some examples, a content creator such as an application developer invokes the primitive ID map generator to generate a primitive ID map based on a mesh and provides this primitive ID map along with the mesh as part of the application to be executed. In various examples, the primitive ID map generator first generates an initial primitive ID map by identifying the primitive ID samples within the primitive ID map that are within each primitive of the mesh and assigning the primitive IDs to the primitive ID samples based on this correlation. Subsequently, the primitive ID map generator modifies one or more of the primitive ID samples to refer to different triangles in accordance with the teachings herein. In an example, the primitive ID map generator identifies one or more triangles of the mesh that are not represented in the initial primitive ID map and generates a modified primitive ID map by modifying one or more primitive ID samples to refer to such unrepresented triangles instead of a different triangle (e.g., an over-represented triangle which may be represented by multiple primitive IDs in the original primitive ID map) or no triangle. In some examples, the primitive ID map generator selects, as primitive ID samples to modify, samples that are within an expected search radius of unrepresented triangles.

Figure 7:
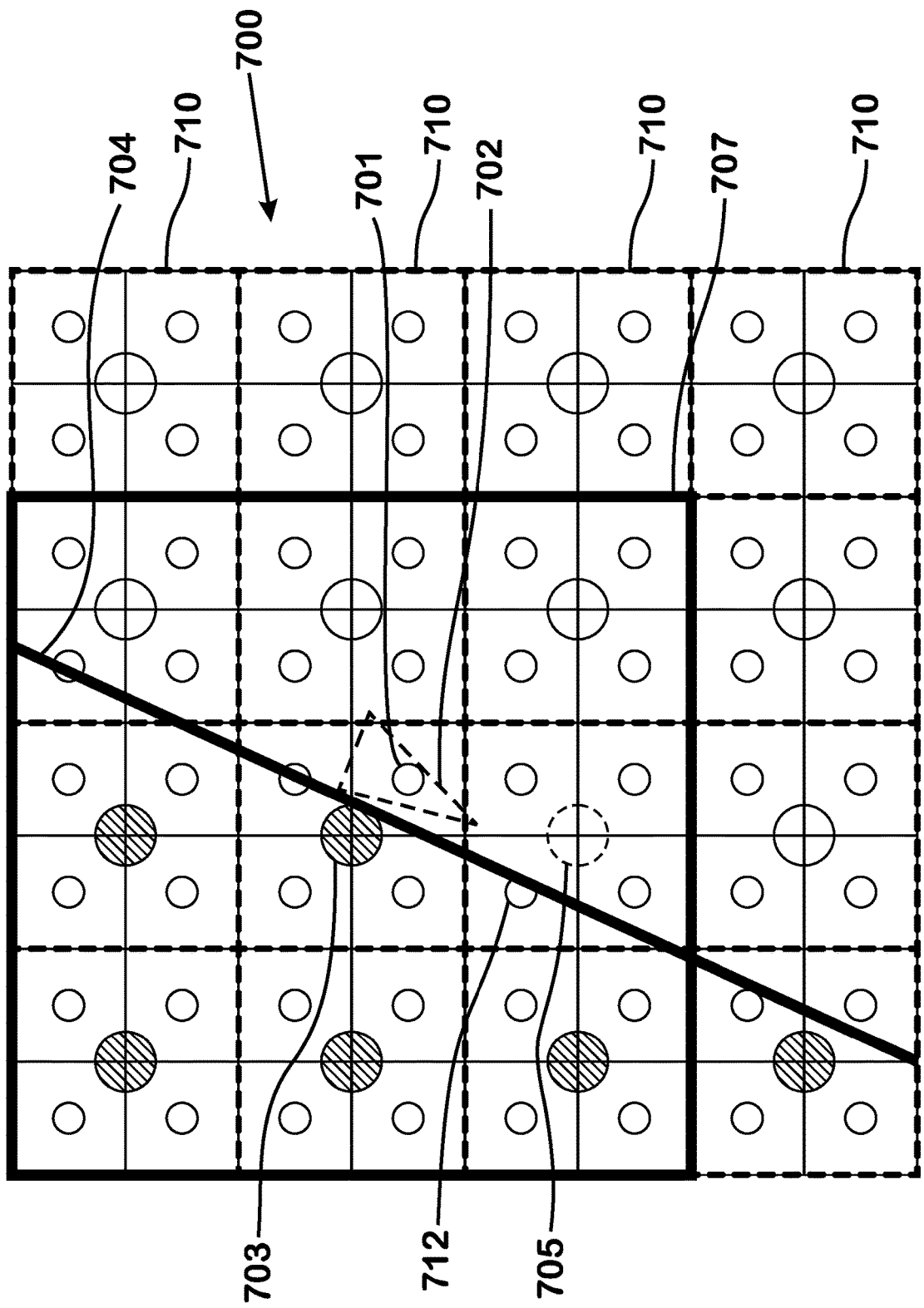
FIG. 7 illustrates sampling of an augmented primitive ID map, according to an example.

FIG. 7 illustrates an example operation for identifying a primitive ID for a texture sample using a primitive ID map 700 in which some of the primitive ID samples (large circles) identify triangles that are not within associated primitive ID sample areas 710, according to an example. In the example, the primitive ID mapper 250 is tasked with identifying which primitive is associated with the texture sample 701 that is within the tiny dashed triangle 702. Note that the primitive ID mapper 250 does not know at this point that the tiny dashed triangle 702 is the "correct" primitive for texture sample 701. This fact is shown in FIG. 7 for illustration.

The primitive ID mapper 250 obtains the primitive ID associated with the texture sample 701 from the primitive ID map as the closest primitive ID sample to the texture sample 701, which in the example shown corresponds to primitive ID sample 703. However, in this example, primitive ID sample 703 references the much larger triangle whose boundary is shown with the diagonal line 704 (in FIG. 7, all primitive ID samples with diagonal cross-hatching identify that much larger triangle), rather than the "correct" triangle for texture sample 701-triangle 702. The primitive ID map 700 also includes the primitive ID sample 705. When the primitive ID mapper 250 initially tries to find the correct primitive ID, it selects primitive ID sample 703. However, this selection fails the inclusion test since sample 701 is not within the primitive identified by primitive ID sample 703 (which is the much larger triangle to the left of diagonal line 704). Thus, the system searches within the search radius (3×3 box around primitive ID sample 703, i.e. search rectangle 707) and finds a primitive ID 705 identifying the triangle 702 that the sample at issue is actually within. As the sample 701 passes the inclusion test for triangle 702, the primitive ID mapper 250 has found the "correct" triangle for the texture sample 701.

In FIG. 7, primitive ID sample 705 is not within any triangle. There is no triangle within the area shown that is to the right of the triangle indicated by line 704, other than triangle 702. Regardless, the closest texture sample to primitive ID sample 705 that is within a triangle is texture sample 712. Thus, it might seem natural for the primitive ID map generator to set, as the primitive for primitive ID sample 705, the triangle associated with line 704. This would allow the primitive ID mapper 250 to select the correct primitive on the first try for the texture sample 712, without performing a search. However, instead of having the primitive ID sample 705 point to the triangle indicated by line 704, the primitive ID mapper 250 instead has that primitive ID sample 705 point to triangle 702. Thus, in a sense, the primitive ID mapper 250 has "stolen" one of the primitive ID samples 705 that would be used for the triangle illustrated by line 704, for use with triangle 702. It would be possible in this example for the primitive ID map generator to use other primitive IDs within the search area to point to triangle 702, instead. Indeed, use of any of the primitive ID samples to the right of the texture sample 701 would not incur the penalty associated with stealing one of the primitive ID samples from the triangle associated with line 704. However, in another example, the area to the right of the line 704 is associated with a different triangle and thus there is no possibility to refrain from "stealing" a primitive ID sample from a triangle for triangle 702. In this case, the primitive ID map generator would select any such primitive ID sample for use for the triangle 702. In some examples, in determining which primitive ID sample to select for association with a particular triangle that does not overlap any primitive ID sample, the primitive ID map generator considers the effect that such selection has on the performance for other texture samples. In some examples, the primitive ID map generator attempts to minimize the number of texture samples that are affected for a triangle from which the primitive ID sample is "stolen." Any other technically feasible technique for selecting a primitive ID sample for a triangle is possible.

In some examples, the search area 707 is an area defined by a radius in two dimensions and centered around the primitive ID that is tested for inclusion first. In some examples, the radius in each dimension indicates a number of primitive ID samples in that dimension, in two opposing directions, that determine the size of the search area 707 in that dimension.

In some examples, the primitive ID mapper 250 sets the size of the search area 707 based on a variety of factors. In some examples, adjustments to the size of the search area result from the sample density/resolution within texture space 502 varying with respect to the primitive ID sample resolution. More specifically, in certain applications such as decoupled rendering, the texture samples represent samples of a texture to be rendered and the primitive ID samples are used to find the primitive that include information for such rendering. In decoupled rendering, the resolution of the texture samples can be varied, which results in a variation with respect to the primitive ID samples. For example, where in FIG. 5 there are 9 texture samples per primitive ID sample, there could be 16 texture samples per primitive ID sample, or 1 texture sample per primitive ID sample, or there could even be 9 primitive ID samples per one texture sample. If there were 16 primitive ID samples per texture space sample, then checking an area of 16 primitive ID samples will not result in the search extending far away from the texture space sample. Thus the primitive ID mapper 250 varies the search area 707 to account for a variety of factors such as the relative resolution between the primitive ID samples and the texture samples. In some examples, as the resolution of the primitive IDs with respect to that of the texture samples increases, the search area increases as well. By contrast, in examples where the resolution of the primitive IDs with respect to that of the texture sample decreases, the search area decreases. It is also possible for there to be an anisotropic resolution ratio (different ratio in different directions), in which the primitive ID resolution has a different ratio to that of the texture samples in different directions. In some such example, the primitive ID mapper 250 adjusts the search area to be rectangular rather than square.

Figure 8:
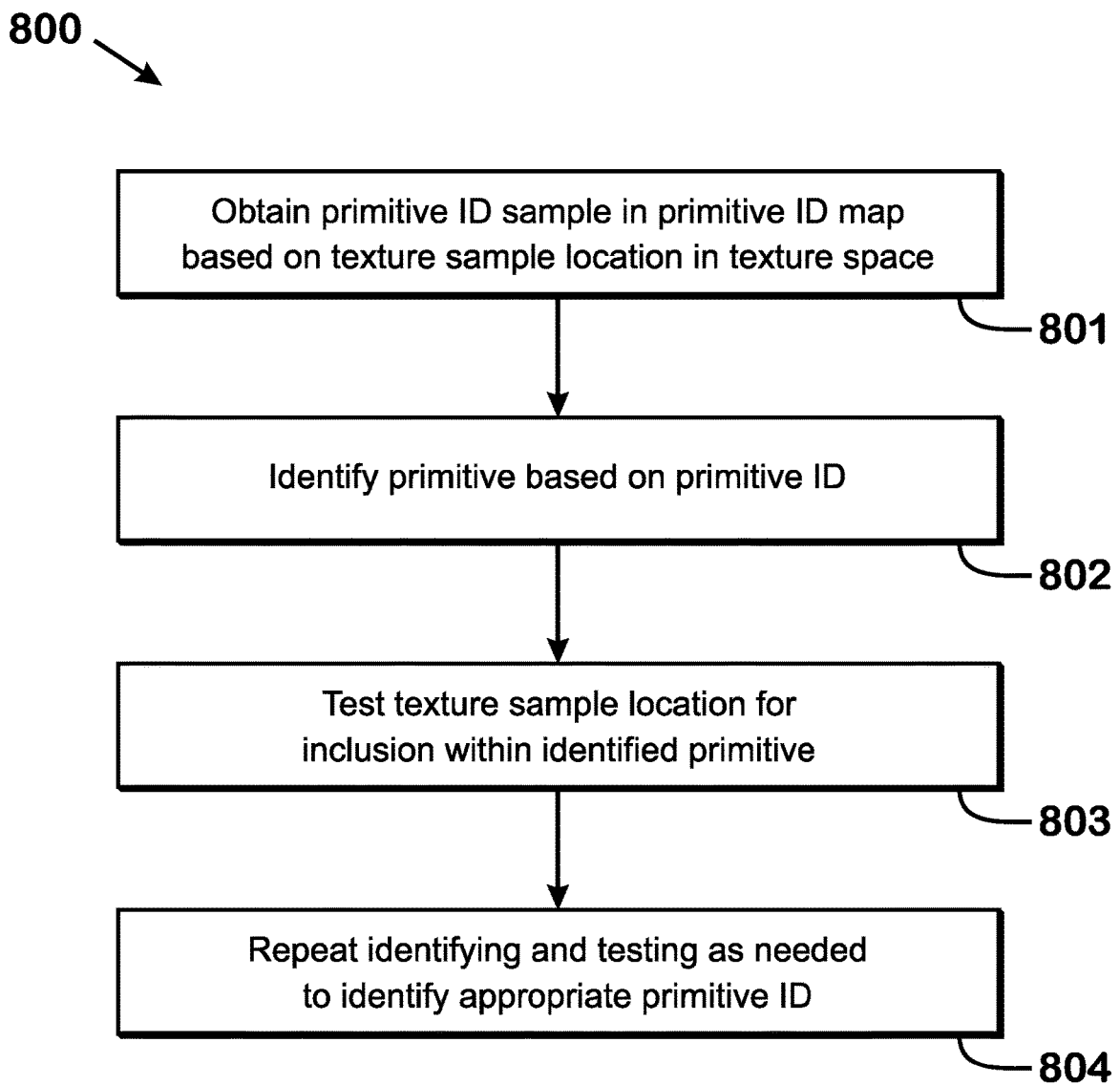
FIG. 8 is a flow diagram of a method for sampling a primitive ID map, according to an example.

FIG. 8 is a flow diagram of a method 800 for sampling a primitive ID map, according to an example. In step 801, the primitive ID mapper 250 obtains a primitive ID sample in a primitive ID map based on a texture sample location in a texture space. In step 802, the primitive ID mapper 250 identifies a primitive based on the primitive ID. In step 803, the primitive ID mapper 250 tests the texture sample for inclusion in the identified primitive. In step 804, steps 801-803 are repeated as needed to identify an appropriate primitive ID. In some examples, in between steps 803 and 804, a search area calculation/adjustment is performed.

In some embodiments, the texture coordinates of the primitive vertices are used in step 803 to calculate barycentric coordinates, which are then used to evaluate the texture sample location for inclusion within the primitive. If the inclusion test is positive (the texture sample location is within the triangle), then the selected primitive ID is used in subsequent steps (and step 804 is skipped). If the inclusion test is negative, in step 804 the process is repeated for one or more other primitive IDs identified that are within the vicinity of the original primitive ID sample until a correct triangle is found. If no precise match is found, the primitive identified by the primitive ID sample that is closest to the texture sample is selected in step 804. As described above, the primitive ID mapper 250 can vary the search area used for identifying primitive ID sample(s) to account for various factors such as differences in resolution between the samples in the texture space and the samples in the primitive ID map.

In some implementations, a primitive ID map that includes primitive ID samples that do not "perfectly" correspond to the primitives is used for the process shown in FIG. 8. In various examples, in such a primitive ID map, data for small triangles that would otherwise be missed is redistributed into adjacent cells which store redundant information about larger triangles in the neighborhood.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, the command processor 136, compute units 132, SIMD units 138, primitive ID mapper 250, input assembler stage 302, vertex shader stage 304, hull shader stage 306, tessellator stage 308, domain shader stage 310, geometry shader stage 312, rasterizer stage 314, pixel shader stage 316, or output merger stage 318 are implemented fully in hardware, fully in software executing on processing units, or as a combination thereof. In various examples, such "hardware" includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for sampling a primitive ID map, the method comprising:
   for a sample point having a location in a texture space, obtaining a primitive ID from the primitive ID map based on the location of the sample point in the texture space, wherein the primitive ID defines an identified primitive;
   testing the location in the texture space for inclusion within the identified primitive; and
   selecting either the primitive ID or a different primitive ID based on the testing, the selecting comprising, in response to the testing indicating that the location is outside of the identified primitive, obtaining sample locations associated with a neighboring primitive and testing the location for inclusion within the neighboring primitive.

2. The method of claim 1, further comprising, in response to the location being outside of the neighboring primitive, repeating the testing using one or more additional neighboring primitives.

3. The method of claim 2, wherein the repeating continues until a neighboring primitive is found that includes the location.

4. The method of claim 3, further comprising:
   in response to the repeating failing to identify a neighboring primitive that includes the location, identifying a primitive closest to the location.

5. The method of claim 3, further comprising varying a neighborhood in which to search for a neighboring primitive.

6. The method of claim 1, wherein the texture space and the primitive ID map have different resolutions.

7. The method of claim 1, wherein the primitive ID map includes information associated with smaller triangles and larger triangles, wherein information for at least one of the smaller triangles is stored in a primitive ID sample associated with at least one of the larger triangles in a vicinity of the at least one smaller triangle.

8. The method of claim 1, further comprising constructing the primitive ID map based on characteristics of primitives of a scene.

9. A system for sampling a primitive ID map, the system comprising:
   a memory configured to store the primitive ID map; and
   a processor configured to
      for a sample point having a location in a texture space, obtain a primitive ID from the primitive ID map based on the location of the sample point in the texture space, wherein the primitive ID defines an identified primitive;
      test the location in the texture space for inclusion within the identified primitive; and
      select either the primitive ID or a different primitive ID based on the testing, the selecting comprising, in response to the testing indicating that the location is outside of the identified primitive, obtaining sample locations associated with a neighboring primitive and testing the location for inclusion within the neighboring primitive.

10. The system of claim 9, wherein the processor is further configured to, in response to the location being outside of the neighboring primitive, repeat the testing using one or more additional neighboring primitives.

11. The system of claim 10, wherein the repeating continues until a neighboring primitive is found that includes the location.

12. The system of claim 11, wherein the processor is further configured to:
    in response to the repeating failing to identify a neighboring primitive that includes the location, identify a primitive closest to the location.

13. The system of claim 11, wherein the processor is further configured to vary a neighborhood in which to search for a neighboring primitive.

14. The system of claim 9, wherein the texture space and the primitive ID map have different resolutions.

15. The system of claim 9, wherein the primitive ID map includes information associated with smaller triangles and larger triangles, wherein information for at least one of the smaller triangles is stored in a primitive ID sample associated with at least one of the larger triangles in a vicinity of the at least one smaller triangle.

16. The system of claim 9, wherein the processor is further configured to construct the primitive ID map based on characteristics of primitives of a scene.

17. A non-transitory computer-readable medium storing instructions that, when executed by a processor, cause the processor to perform operations comprising:
    for a sample point having a location in a texture space, obtaining a primitive ID from the primitive ID map based on the location of the sample point in the texture space, wherein the primitive ID defines an identified primitive;
    testing the location in the texture space for inclusion within the identified primitive; and
    selecting either the primitive ID or a different primitive ID based on the testing, the selecting comprising, in response to the testing indicating that the location is outside of the identified primitive, obtaining sample locations associated with a neighboring primitive and testing the location for inclusion within the neighboring primitive.

18. The non-transitory computer-readable medium of claim 8, wherein the operations further comprise, in response to the location being outside of the neighboring primitive, repeating the testing using one or more additional neighboring primitives.

19. The non-transitory computer-readable medium of claim 18, wherein the repeating continues until a neighboring primitive is found that includes the location.

20. The non-transitory computer-readable medium of claim 19, wherein the operations further comprise:
    in response to the repeating failing to identify a neighboring primitive that includes the location, identifying a primitive closest to the location.

* * * * *